(12) United States Patent
Fujimoto et al.

(10) Patent No.: US 11,252,565 B2
(45) Date of Patent: Feb. 15, 2022

(54) FIELD DEVICE, INFORMATION COLLECTING SYSTEM, AND INFORMATION COLLECTING METHOD

(71) Applicant: Yokogawa Electric Corporation, Tokyo (JP)

(72) Inventors: Naoyuki Fujimoto, Tokyo (JP); Masato Yamaji, Tokyo (JP); Shoji Nagano, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 203 days.

(21) Appl. No.: 16/724,842

(22) Filed: Dec. 23, 2019

(65) Prior Publication Data

US 2020/0213853 A1 Jul. 2, 2020

(30) Foreign Application Priority Data

Dec. 27, 2018 (JP) .............................. JP2018-244970

(51) Int. Cl.
H04L 29/06 (2006.01)
H04W 12/106 (2021.01)

(52) U.S. Cl.
CPC ........... *H04W 12/106* (2021.01); *H04L 63/20* (2013.01)

(58) Field of Classification Search
None
See application file for complete search history.

(56) References Cited

U.S. PATENT DOCUMENTS

| 6,985,831 B2 | 1/2006 | Ito et al. |
| 2004/0168053 A1 | 8/2004 | Kaszkin et al. |

(Continued)

FOREIGN PATENT DOCUMENTS

| JP | 10-508129 A | 8/1998 |
| JP | 2003-248515 A | 9/2003 |

(Continued)

OTHER PUBLICATIONS

Dong-Hyuk Choi et al., "Wireless Fieldbus for Networked Control Systems using LR-WPAN", International Journal of Control, Automation, and Systems, vol. 6, No. 1, pp. 119-125, Feb. 28, 2008, XP55688265, Retrieved from the Internet: URL:http://www.ijcas.com/admin/paper/files/IJCAS_v6_n1_pp.119-125.pdf, 7 pages total.

(Continued)

*Primary Examiner* — Cai Y Chen
(74) *Attorney, Agent, or Firm* — Sughrue Mion, PLLC

(57) ABSTRACT

A field device according to one aspect of the present invention may include a first processor configured to perform a process of communicating first information used for process control and a process of generating second information including a diagnosis result obtained by performing self-diagnosis of the field device, a second processor including a first wireless unit configured to perform wireless communication, the second processor being configured to request the first processor to read at least the second information and to perform a process of transmitting, from the first wireless unit, the second information obtained through the read request as a wireless signal, and a security unit configured to permit or reject a request made to the first processor by the second processor in accordance with a rule which is specified in advance.

20 Claims, 12 Drawing Sheets

(56) References Cited

U.S. PATENT DOCUMENTS

| | | | | |
|---|---|---|---|---|
| 2005/0245291 A1* | 11/2005 | Brown | ............... | G05B 19/4185 |
| | | | | 455/572 |
| 2005/0289276 A1* | 12/2005 | Karschnia | .......... | G05B 19/4185 |
| | | | | 710/305 |
| 2007/0038700 A1* | 2/2007 | Eryurek | .................. | H04L 43/00 |
| | | | | 709/203 |
| 2016/0043866 A1 | 2/2016 | Nixon et al. | | |
| 2018/0313373 A1 | 11/2018 | Pinet et al. | | |
| 2018/0316762 A1 | 11/2018 | Matsumoto et al. | | |

FOREIGN PATENT DOCUMENTS

| | | |
|---|---|---|
| JP | 2008-500659 A | 1/2008 |
| JP | 2016-38919 A | 3/2016 |
| JP | 2018-185781 A | 11/2018 |
| WO | 96/12993 A1 | 5/1996 |
| WO | 2005/116787 A1 | 12/2005 |
| WO | 2016/198622 A1 | 12/2016 |

OTHER PUBLICATIONS

Asmaa Tellabi et al., "Overview of Authentication and Access Controls for I&C systems", 2018 IEEE 16TH International Conference On Industrial Informatics (INDIN), IEEE, 2018, XP033407971, pp. 882-889 (8 pages total).

* cited by examiner

| TYPE OF TARGET | TYPE OF REQUEST | |
|---|---|---|
| | Read | Write |
| SENSOR VALUE | Accept | Block |
| SENSOR SETTINGS | Accept | Block |
| DIAGNOSIS INFORMATION | Accept | Block |
| DIAGNOSIS SETTINGS | Accept | Accept |
| WIRELESS SETTINGS | Accept | Accept |

FIG. 7

| TARGET | REQUEST SOURCE | OPERATION | |
|---|---|---|---|
| | | Read | Write |
| SENSOR VALUE | WIRELESS UNIT | Accept | Block |
| SENSOR SETTINGS | | Accept | Block |
| DIAGNOSIS INFORMATION | | Accept | Block |
| DIAGNOSIS SETTINGS | | Accept | Accept |
| WIRELESS SETTINGS | | Accept | Accept |
| SENSOR VALUE | SHORT DISTANCE WIRELESS UNIT (TERMINAL DEVICE) | Accept | Accept |
| SENSOR SETTINGS | | Accept | Accept |
| DIAGNOSIS INFORMATION | | Accept | Accept |
| DIAGNOSIS SETTINGS | | Accept | Accept |
| WIRELESS SETTINGS | | Accept | Accept |

FIELD DEVICE, INFORMATION COLLECTING SYSTEM, AND INFORMATION COLLECTING METHOD

BACKGROUND OF THE INVENTION

Field of the Invention

The present invention relates to a field device, an information collecting system, and an information collecting method.

The present application claims priority based on Japanese patent application 2018-244970, filed on Dec. 27, 2018 and includes herein by reference the content thereof.

Description of Related Art

In plants, factories, and the like (hereinafter, collectively referred to simply as "plants"), distributed control systems (DCS) have been constructed, and advanced automatic operation has been realized therewith. This distributed control system is a control system in which controllers controlling field equipment (a measurement device, an operation device, a display, a notifier, and other device) which are called field devices are distributed in each of several control loops.

In such a distributed control system, an operation in which the controller acquires measurement results of the measurement device (for example, a sensor), obtains an operation amount of the operation device (for example, an actuator) in accordance with the measurement results, and operates the operation device in accordance with the operation amount is repeated. For this reason, information used for process control such as a measurement result of the measurement device and an operation amount of the operation device is exchanged between the controller and the field device.

Published Japanese Translation No. H10-508129 of the PCT International Publication (hereinafter, referred to as Patent Document 1) discloses a distributed control system of the related art which is accessible to a field device without going through a controller. Specifically, in the distributed control system disclosed in the Patent Document 1, the field device is capable of wirelessly communicating with a wireless transceiver. Wireless communication with the field device is performed using the wireless transceiver, and thus it is possible to access a function of the field device which is not accessed by the controller of the distributed control system and to access a field device that cannot communicate with the controller.

SUMMARY OF THE INVENTION

In the distributed control system disclosed in Patent Document 1, a device used to perform wireless communication with the field device is a wireless transceiver used in a plant. For this reason, it is considered that security problems such as the leakage of various information of the field device outside of the plant and access to the field device from outside of the plant do not occur.

However, in a case where the field device is connected to the Internet using a technique called the Internet of Things (IoT) or the Industrial Internet of Things (IIoT), it is considered that a third party may be able to gain access to the field device. As described above, since information used for process control is exchanged between the controller and the field device, it is necessary to secure sufficient security in a case where the field device is connected to the Internet. The Internet is an example of a public line, and it is also considered that a third party may be able to gain access to the field device through a public line other than the Internet.

One aspect of the present invention provides a field device which can be connected to a public line such as the Internet while securing security, an information collecting system and an information collecting method which are capable of collecting information from the field device while securing security.

A field device (1 to 5) according to one aspect of the present invention may include a first processor (10) configured to perform a process of communicating first information used for process control and a process of generating second information including a diagnosis result obtained by performing self-diagnosis of the field device, a second processor (20) including a first wireless unit (25) configured to perform wireless communication, the second processor being configured to request the first processor to read at least the second information and to perform a process of transmitting, from the first wireless unit, the second information obtained through the read request as a wireless signal, and a security unit (15) configured to permit or reject a request made to the first processor by the second processor in accordance with a rule which is specified in advance.

According to the one aspect of the present invention, it is possible to connect a field device to a public line such as the Internet while securing security and to collect information from the field device while securing security.

BRIEF DESCRIPTION OF THE DRAWINGS

FIG. 7 is a diagram showing an example of a rule specified by a security unit of the field device in the second embodiment of the present invention.

DETAILED DESCRIPTION OF THE INVENTION

Figure 1:
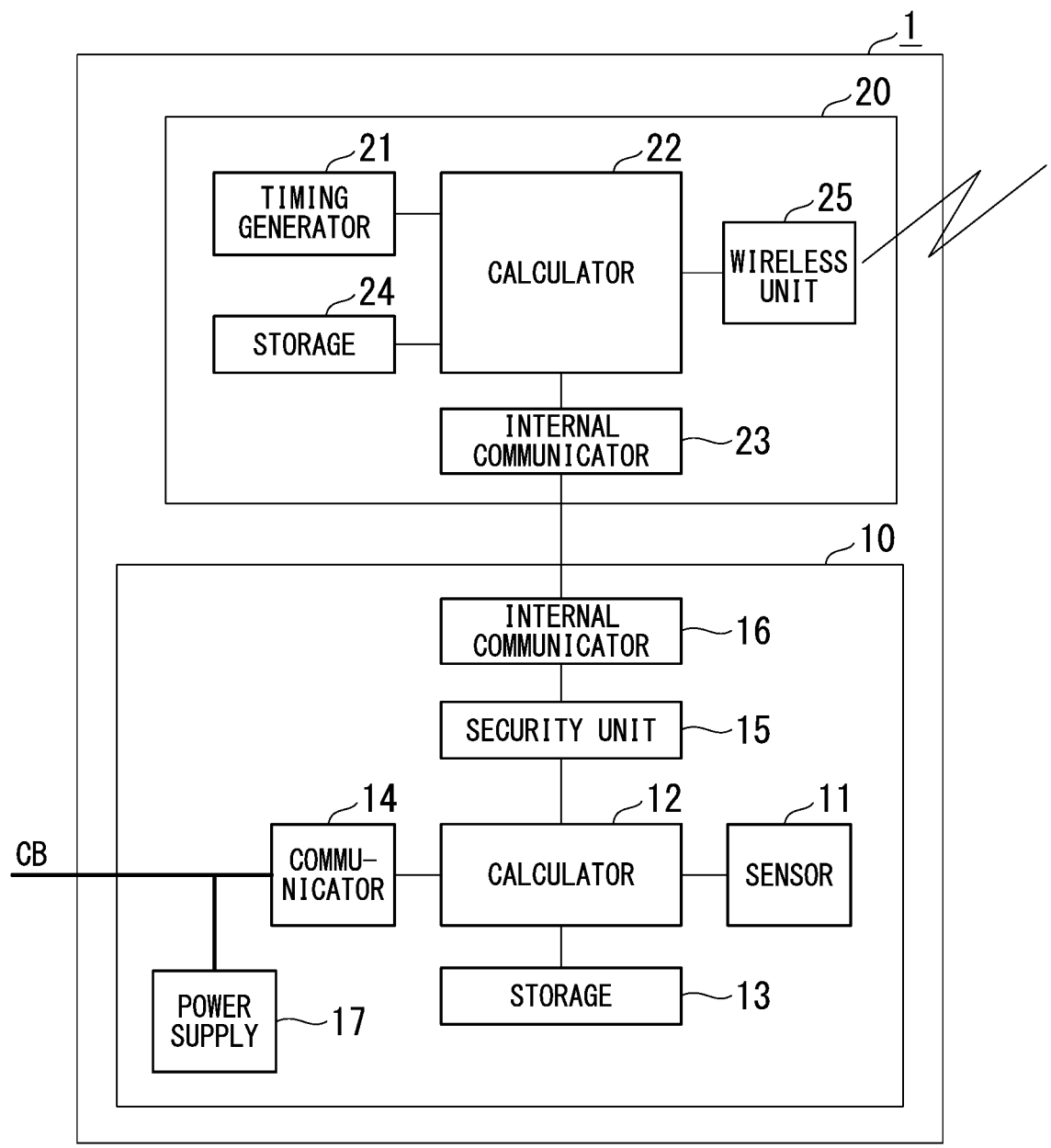
FIG. 1 is a block diagram showing main components of a field device according to a first embodiment of the present invention.

Hereinafter, a field device, an information collecting system, and an information collecting method according to an embodiment of the present invention will be described in detail with reference to the accompanying drawings. Hereinafter, first, an outline of an embodiment of the present invention will be described, and then details of the embodiment of the present invention will be described.

[Outline]

Prior to about 1990, a distributed control system was an analog system in which a controller and a field device were connected to each other through an analog signal line (for example, a 4-20 mA analog signal line). In such a distributed control system, information used for process control (a measurement result of a measurement device, an operation amount of an operation device, and the like) was exchanged between the controller and the field device using an analog signal. An example of process control was control for adjusting a flow rate of a fluid by changing the opening (operation amount) of a value through which the fluid flowed in accordance with the value of the flow rate (sensor value) of the fluid which is a measurement result.

After around 1990, a digitized distributed control system appeared. In the distributed control system, a controller and a field device became intelligent, and a self-diagnosis function (a function of diagnosing its own state) was provided. In such a distributed control system, information used for process control was exchanged between the controller and the field device using a digital signal, and information indicating self-diagnosis results in the controller and the field device was collected in a high-order device management server using a digital signal. In recent years, a digital signal has also been exchanged between the controller and the field device through industrial wireless communication.

In the plant, there are an operator who operates a plant and a worker who maintains the plant. The operator of the plant is responsible for monitoring information used for process control, immediately coping with any problems, and allowing the plant to be in operation appropriately. On the other hand, the worker of the plant is responsible for inspecting equipment, devices, facilities, and the like provided in the plant, performing repair, replacement, and the like if necessary, and allowing the equipment, the devices, the facilities, and the like to be operated appropriately.

In the above-described digitalized distributed control system, two pieces of information having different properties (information used for process control and information indicating self-diagnosis results) are used. The information used for process control is information to be managed by an operator of a plant and is information required to be monitored and controlled in real time because it is directly related to the quality and productivity of a product. On the other hand, the information indicating self-diagnosis results is information to be managed by a worker of the plant and is information which may be confirmed with a frequency of approximately once every several hours to several months because the information is not directly related to the quality and productivity of a product and is not likely to rapidly change.

It is preferable that such two pieces of information having different properties be completely separated and managed individually by the operator and the worker of the plant. However, in a current distributed control system, information indicating a self-diagnosis result is collected in a device management server via a controller that handles information used for process control, and thus it is difficult to completely separate the two pieces of information having different properties. For this reason, for example, even when only the settings related to self-diagnosis are changed, it may be necessary to change the settings of the controller that handles information used for process control.

When paths of the above-described two pieces of information having different properties are separated from each other, it is considered that the two pieces of information having different properties can be completely separated. For example, when a field device is connected to the Internet using a technique called IoT or IIoT and information indicating a self-diagnosis result is collected by a collecting device connected to the Internet, it is considered that the information indicating a self-diagnosis result can be completely separated from information used for process control. However, in a case where a field device is connected to the Internet which is easily accessible by a third party, it is necessary to secure sufficient security. This is the same as in a case where a field device is connected to a public line other than the Internet.

In embodiments of the present invention, a security unit is provided between a first processor and a second processor. The first processor performs a process of communicating first information used for process control and a process of performing self-diagnosis for the field device and generating second information indicating a diagnosis result. The second processor includes a first wireless unit for performing wireless communication. In addition, security is secured by the security unit permitting or rejecting a request given to the first processor by the second processor in accordance with a rule which is specified in advance.

First Embodiment

<Configuration of Field Device>

FIG. 1 is a block diagram showing main components of a field device according to a first embodiment of the present invention. As shown in FIG. 1, a field device 1 of the present embodiment includes a sensor module 10 (first processor) and a wireless module 20 (second processor), and performs transmission of a sensor value (first information) used for process control and transmission of diagnosis information (second information) indicating a self-diagnosis result of the host device through different paths.

The field device 1 is connected to a controller (not shown) that forms the core of a distributed control system through a transmission line CB. The transmission line CB is, for example, a 4-20 mA analog signal line. However, the transmission line CB is not limited to the 4-20 mA analog signal line, and may be another analog signal line or may be a digital signal line. The field device 1 is connected to a public line in a wireless manner. In the present embodiment, a case where the field device 1 is connected to the Internet which is a type of public line in a wireless manner will be described as an example. The field device 1 transmits the above-described sensor value to a controller not shown in the drawing through the transmission line CB and transmits the above-described diagnosis information as a wireless signal. The diagnosis information transmitted from the field device 1 is collected in a collecting device (not shown) connected to the Internet.

The sensor module 10 includes a sensor 11, a calculator 12, a storage 13, a communicator 14, a security unit 15, an internal communicator 16, and a power supply 17. The sensor module 10 having such a configuration performs a process of transmitting a sensor value used for process control (transmission process through the transmission line CB). The sensor module 10 performs self-diagnosis for the field device 1 to perform a process of generating diagnosis information.

The sensor 11 measures a physical quantity to be measured (for example, a temperature, a pressure, a flow rate, and the like) and outputs a measurement result as a sensor value. The calculator 12 takes in the sensor value output from the sensor 11, stores the sensor value in the storage 13, reads out the sensor value stored in the storage 13, performs predetermined processing on the sensor value as necessary, and transmits the processed sensor value to the communicator 14. In addition, the calculator 12 performs self-diagnosis for the field device 1, generates diagnosis information indicating a diagnosis result, and stores the generated diagnosis information in the storage 13. Furthermore, the diagnosis information includes, for example, information indicating an ambient temperature of the field device 1, information indicating an output voltage (power voltage) of the power supply 17, information indicating an abnormality of an internal circuit of the field device 1, information indicating an abnormality of a value processed in each unit of the field device 1, and other information indicating the state of the field device 1.

The calculator 12 performs processing according to a request permitted in the security unit 15 among requests output from the wireless module 20. For example, in a case where a request for reading diagnosis information stored in the storage 13 is output from the wireless module 20 and is permitted in the security unit 15, the calculator 12 reads out the diagnosis information stored in the storage 13 and outputs the diagnosis information to the wireless module 20 as a response.

The storage 13 stores a sensor value output from the calculator 12 and diagnosis information generated by the calculator 12. The storage 13 stores setting information regarding the sensor 11 and setting information regarding self-diagnosis. The storage 13 may store setting information regarding a wireless unit 25 (to be described later in detail) provided in the wireless module 20. The storage 13 is realized by a non-volatile memory such as a flash read only memory (ROM) or an electrically erasable and programmable ROM (EEPROM). The storage 13 may be realized by a volatile memory such as a random access memory (RAM).

The communicator 14 is connected to the transmission line CB, and transmits a sensor value read out by the calculator 12 through the transmission line CB. Specifically, the communicator 14 generates a communication frame including the sensor value read out by the calculator 12 and transmits the generated communication frame to the transmission line CB. Furthermore, here, the communicator 14 generates a communication frame, but a communication frame may be generated by the calculator 12.

The security unit 15 permits or rejects a request made to the sensor module 10 by the wireless module 20 according to a rule which is specified in advance. Only a request permitted by the security unit 15 among requests made to the sensor module 10 by the wireless module 20 is input to the calculator 12. The security unit 15 is provided to secure the security of the field device 1 connected to the Internet by the wireless module 20. Specifically, the security unit 15 is provided to prevent an attack or illegal access from being performed on the sensor module 10 that handles sensor values and diagnosis information which are used for process control.

The above-described rule used by the security unit 15 is specified on the basis of the type of request made to the sensor module 10 by the wireless module 20 and the type of information to be requested. That is, the security unit 15 performs the above-described permission and rejection according to what request the wireless module 20 makes for which information among pieces of information used by the sensor module 10.

Figures 2, 3:
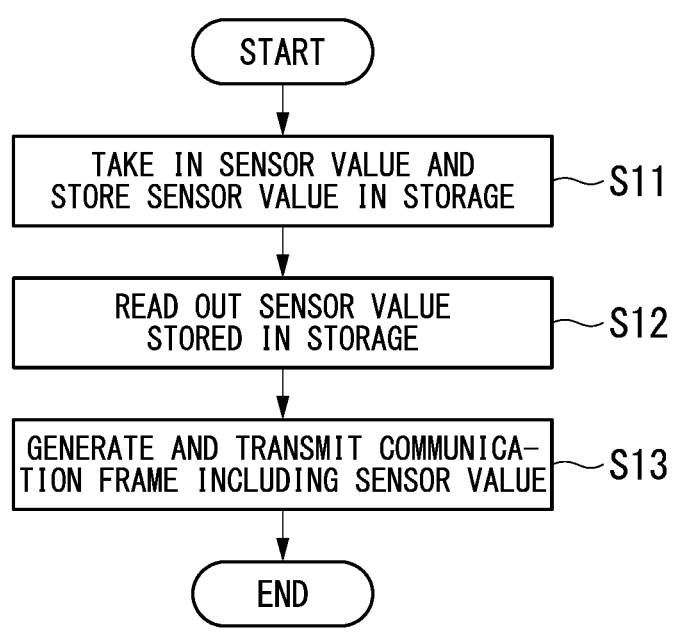
FIG. 2 is a diagram showing an example of a rule specified by a security unit of the field device according to the first embodiment of the present invention.
FIG. 3 is a flowchart showing a sensor value transmission operation in the first embodiment of the present invention.

FIG. 2 is a diagram showing an example of a rule specified by the security unit of the field device in the first embodiment of the present invention. In the example shown in FIG. 2, "read request (Read)" and "write request (Write)" are specified as the type of request made to the sensor module 10 by the wireless module 20, and "sensor value", "sensor settings", "diagnosis information", "diagnosis settings", and "wireless settings" are specified as the type of information to be requested. The "sensor settings" are setting information regarding the sensor 11, the "diagnosis settings" is setting information regarding self-diagnosis, and the "wireless settings" is setting information regarding the wireless unit 25 (to be described later in detail) provided in the wireless module 20.

In the example shown in FIG. 2, with respect to "read request", "permission (Accept)" is specified for all of "sensor value", "sensor settings", "diagnosis information", "diagnosis settings", and "wireless settings". On the other hand, with respect to "write request", "permission (Accept)" is specified for "diagnosis settings" and "wireless settings", but "rejection (Block)" is specified for "sensor value", "sensor settings", and "diagnosis information". Since the "sensor value" and the "sensor settings" are important information related to process control and the "diagnosis information" is important information indicating the state of the field device 1, the "write request" of which the content is changeable is specified so as to be "rejected".

Referring back to FIG. 1, the internal communicator 16 is connected to the internal communicator 23 (to be described later in detail) provided in the wireless module 20, and transmits and receives various information to and from the internal communicator 23. The internal communicator 16 is provided to allow the sensor module 10 and the wireless module 20 to exchange various information. Furthermore, the internal communicator 16 can also supply power generated by the power supply 17 to the internal communicator 23 provided in the wireless module 20.

The power supply 17 generates power required for at least the sensor module 10 to operate from a current flowing through the transmission line CB. Furthermore, the power supply 17 may generate power required for the field device 1 to operate (power required for the wireless module 20 and the like to operate, in addition to the sensor module 10). Power generated by the power supply 17 is supplied to each block of the sensor module 10. In addition, power generated by the power supply 17 is also supplied to the wireless module 20 through the internal communicator 16.

The wireless module 20 includes a timing generator 21, a calculator 22, an internal communicator 23, a storage 24, and a wireless unit 25 (first wireless unit). Such a wireless module 20 allows the field device 1 to perform wireless communication. The wireless module 20 is provided, and thus, for example, the field device 1 can be connected to the Internet in a wireless manner. The wireless module 20 requests the sensor module 10 to read out at least diagnosis information, and performs a process of transmitting diagnosis information obtained through the read request from the wireless unit 25 as a wireless signal.

The wireless module 20 may be attachable to the sensor module 10. For example, the wireless module 20 may be attached to the sensor module 10 by inserting the wireless module 20 into a slot provided in the field device 1 in advance. In this manner, for example, it is possible to reduce the cost of the field device 1 and to allow the field device 1 to retroactively perform wireless communication by retrofitting the wireless module 20 to the field device 1 installed while being connected to the controller through the transmission line CB in advance. The wireless module 20 may be incorporated in the field device 1 from the beginning. The wireless module 20 may be removable or may be non-removable.

The timing generator 21 generates a timing signal for specifying a timing for performing wireless communication. The calculator 22 performs processing for performing wireless communication by the wireless unit 25 at a timing specified by the timing signal generated by the timing generator 21. For example, the calculator 22 performs processing for transmitting diagnosis information stored in the storage 13 of the sensor module 10 from the wireless unit 25 as a wireless signal.

Specifically, the calculator 22 requests the sensor module 10 to read the diagnosis information stored in the storage 13 of the sensor module 10. The calculator 22 reads out identification information (to be described later in detail) stored in the storage 24. The calculator 22 transmits a combination of the diagnosis information obtained through the above-described read request and the identification information read out from the storage 24 to the wireless unit 25 as a wireless signal. The identification information is attached to the diagnosis information, whereby it is possible to easily identify a transmission source of the diagnosis information.

The internal communicator 23 is connected to the internal communicator 16 provided in the sensor module 10 and transmits and receives various information to and from the internal communicator 16. The internal communicator 23 is provided to allow the sensor module 10 and the wireless module 20 to exchange various information together with the internal communicator 16. The internal communicator 23 can also receive power supplied from the internal communicator 16. Power received by the internal communicator 23 is supplied to each block of the wireless module 20.

The storage 24 stores uniquely determined identification information which is allocated to the wireless module 20 in advance. The identification information is information used to identify the wireless module 20 (or the field device 1 provided with the wireless module 20), and for example, an IP address and an address in an EUI64 format can be used. The storage 24 may store setting information regarding the wireless unit 25. The setting information regarding the wireless unit 25 is stored in any one of the storage 13 of the sensor module 10 and the storage 24 of the wireless module 20. The storage 24 may be realized by a non-volatile memory or may be realized by a volatile memory. Since the storage 24 is required to store the above-described identification information, the storage may be realized by a non-volatile memory.

The wireless unit 25 transmits a signal output from the calculator 22 as a wireless signal. For example, the wireless unit 25 generates a communication frame including diagnosis information with identification information attached thereto by the calculator 22 and transmits the communication frame as a wireless signal. The wireless unit 25 generates the communication frame, but the communication frame may be generated by the calculator 22. The wireless unit 25 receives a wireless signal transmitted from the outside and outputs the received wireless signal to the calculator 22. The wireless unit 25 performs wireless communication through, for example, a communication channel (low power wide area network: LPWAN) through which low power consumption long distance wireless communication can be performed. The above-described low power consumption long distance wireless communication is wireless communication based on a communication standard such as LoRa (registered trademark).

The field device 1 is connected to the Internet by the wireless module 20 in a wireless manner. For this reason, for example, it is considered that a request for various information stored in the storage 13 of the sensor module 10 (a read request, a write request) is transmitted to the field device 1 through the Internet. The above-described request transmitted through the Internet is received by the wireless unit 25 and output to the calculator 22, and is then output to the sensor module 10 from the wireless module 20. For this reason, in a case where the above-described request is transmitted through the Internet, it can be said that a request made to the sensor module 10 by the wireless module 20 can be performed through the wireless unit 25 of the wireless module 20 (the request is made when the wireless unit 25 serves as a request source).

<Operations of Field Device>

Next, operations of the field device according to the first embodiment of the present invention will be described. Hereinafter, an operation when a sensor value is transmitted to the controller (a sensor value transmission operation) and an operation of transmitting diagnosis information to the collecting device connected to the Internet (diagnosis information transmission operation) will be described.

<Sensor Value Transmission Operation>

FIG. 3 is a flowchart showing a sensor value transmission operation in the first embodiment of the present invention. The processing in the flowchart shown in FIG. 3 is performed at fixed time intervals (for example, at intervals of one second). When the processing is started, first, in the sensor module 10, a process of taking in a sensor value output from the sensor 11 and storing the sensor value in the storage 13 is performed by the calculator 12 (step S11).

Next, in the sensor module 10, a process of reading out the sensor value stored in the storage 13 and outputting the sensor value to the communicator 14 is performed by the calculator 12 (step S12). Further, in the sensor module 10, a process of generating a communication frame including a sensor value (a sensor value output from the calculator 12) and transmitting the communication frame to the transmission line CB is performed by the communicator 14 (step S13). Through the above-described processes, the sensor value of the sensor 11 is transmitted to a controller not shown in the drawing through the transmission line CB.

<Diagnosis Information Transmission Operation>

Figure 4:
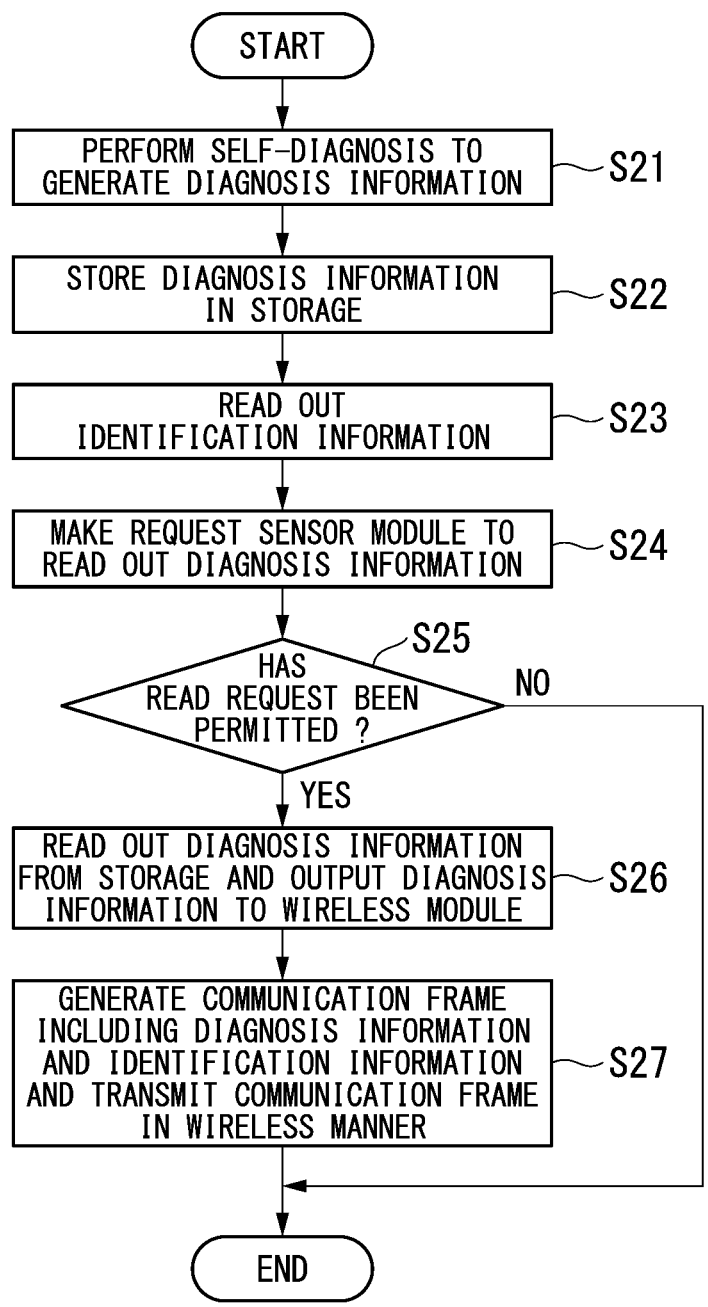
FIG. 4 is a flowchart showing a diagnosis information transmission operation in the first embodiment of the present invention.

FIG. 4 is a flowchart showing a diagnosis information transmission operation in the first embodiment of the present invention. The processing in the flowchart shown in FIG. 4 is performed at a frequency of, for example, approximately once every several hours to several months. When the processing is started, first, in the sensor module 10, a process of performing self-diagnosis of the field device 1 to generate diagnosis information indicating a diagnosis result is performed by the calculator 12 (step S21). Next, in the sensor module 10, a process of storing the generated diagnosis information in the storage 13 is performed by the calculator 12 (step S22).

Subsequently, in the wireless module 20, a process of reading out identification information stored in the storage 24 is performed by the calculator 22 (step S23). Subsequently, in the wireless module 20, a process of requesting the sensor module 10 to read the diagnosis information stored in the storage 13 is performed by the calculator 22 (step S24). The request for reading the diagnosis information is input to the security unit 15 through the internal communicator 23 of the wireless module 20 and the internal communicator 16 of the sensor module 10.

Then, in the security unit 15, it is determined whether or not to permit the read request (the read request for the diagnosis information) which is output from the calculator 22 of the wireless module 20 (step S25). Referring to FIG. 2, since "permission (Accept)" is specified for "read request (Read)" of "diagnosis information", a determination result in step S25 is "YES". Thereby, the read request which is output from the calculator 22 of the wireless module 20 is input to the calculator 12 of the sensor module 10.

When the read request for the diagnosis information is input to the calculator 12, a process of reading out the diagnosis information stored in the storage 13 and outputting the diagnosis information to the wireless module 20 as a response is performed by the calculator 12 in the sensor module 10 (step S26). The diagnosis information which is output from the calculator 12 is input to the calculator 22 through the security unit 15 and the internal communicator 16 of the sensor module 10 and the internal communicator 23 of the wireless module 20 in this order.

Then, in the wireless module 20, a process of attaching the identification information (the identification information which is read out in step S23) to the input diagnosis information and outputting the identification information with the diagnosis information attached thereto to the wireless unit 25 is performed by the calculator 22. Further, in the wireless module 20, a process of generating a communication frame including the diagnosis information and the identification information and transmitting the communication frame from the wireless unit 25 as a wireless signal is performed by the wireless unit 25 (step S27). Through the above-described processes, the diagnosis information of the field device 1 is transmitted to a collecting device not shown in the drawing through the Internet.

Referring to FIG. 2, "rejection (Block)" is specified for "write request (Write)" of each of "sensor value", "sensor settings", and "diagnosis information". For this reason, in a case where "write request" of each of "sensor value", "sensor settings", and "diagnosis information" is output to the sensor module 10 from the wireless module 20, a determination result in step S25 is "NO", and a series of processes shown in FIG. 4 is terminated. That is, "write request" of each of "sensor value", "sensor settings", and "diagnosis information" is rejected by the security unit 15 and is not input to the calculator 12.

As described above, in the field device 1 of the present embodiment, the security unit 15 is provided in the sensor module 10, and the security unit 15 permits or rejects a request made to the sensor module 10 by the wireless module 20 in accordance with a rule which is specified in advance. Thereby, since an attack or illegal access to the sensor module 10 that handles sensor values and diagnosis information which are used for process control is rejected by the security unit 15, security can be secured.

<Information Collecting System>

Figure 5:
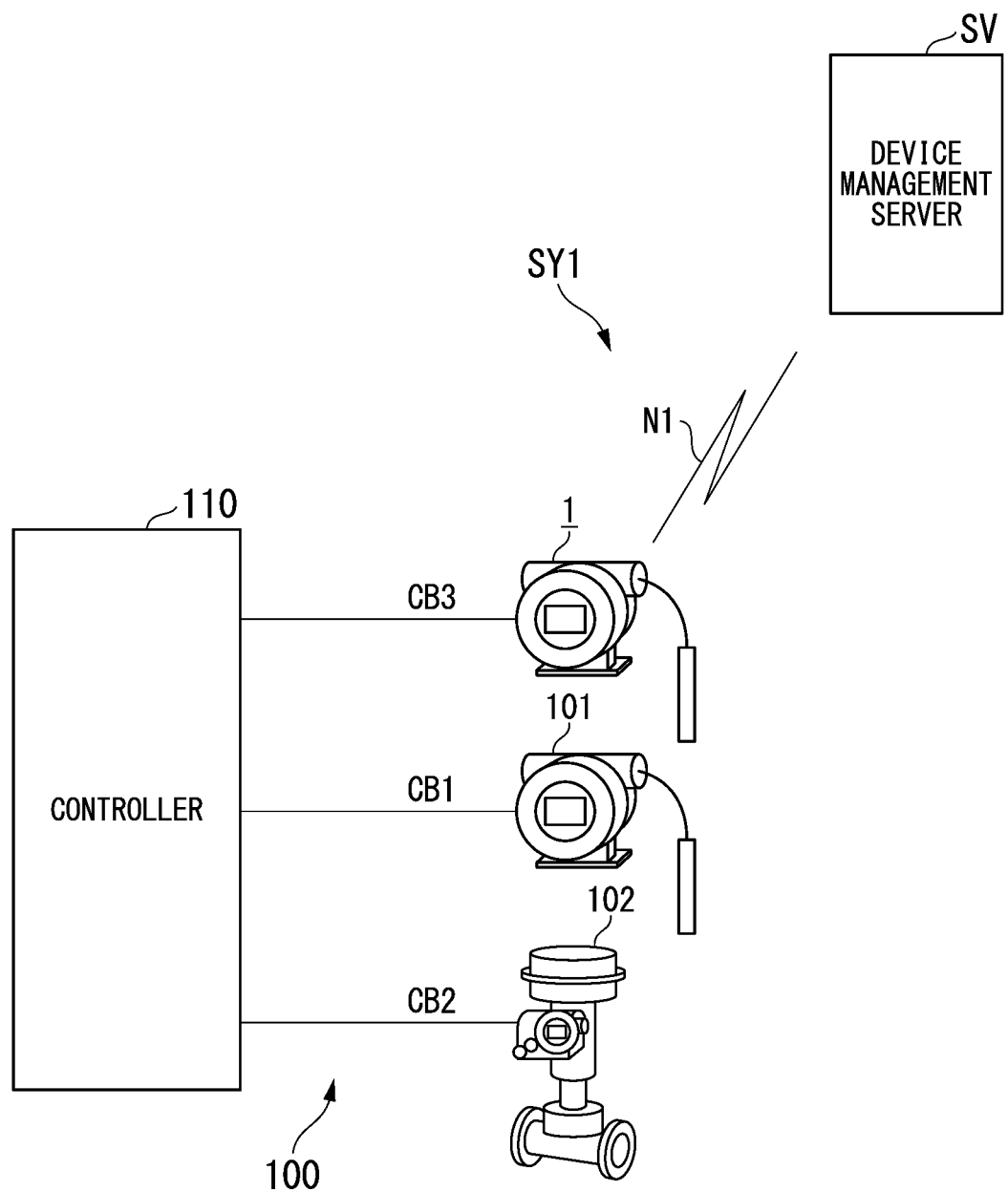
FIG. 5 is a diagram showing main components of an information collecting system according to the first embodiment of the present invention.

FIG. 5 is a diagram showing main components of an information collecting system according to the first embodiment of the present invention. An information collecting system SY1 shown in FIG. 5 includes the field device 1 and a device management server SV (collecting device), and diagnosis information (second information) transmitted through a communication channel N1 capable of low power consumption long distance wireless communication from the field device 1 is collected by the device management server SV. The device management server SV is connected to, for example, the Internet and collects diagnosis information through the communication channel N1 and the Internet.

The field device 1 is connected to a distributed control system 100. The distributed control system 100 is an analog system of the related art which includes field devices 101 and 102 and a controller 110 and exchanges information used for process control using an analog signal. The field device 101 is a sensor device of the related art which transmits a measurement result of a sensor using an analog signal. The field device 102 is an actuator device of the related art which is controlled using an analog control signal to be transmitted. The field devices 101 and 102 do not have a self-diagnosis function.

The controller 110 is a controller of the related art which acquires a measurement result (analog signal) of a sensor which is transmitted from the field device 101 and transmits a control signal (analog signal) based to the acquired measurement result to control the field device 102. The field device 101 is connected to the controller 110 through a transmission line CB1, and the field device 102 is connected to the controller 110 through a transmission line CB2. The transmission lines CB1 and CB2 are, for example, 4-20 mA analog signal lines.

The field device 1 of the present embodiment is connected to the controller 110 of the related art through a transmission line CB3. The transmission line CB3 is, for example, a 4-20 mA analog signal line. The field device 1 transmits a sensor value (analog signal) to the controller 110 through the transmission line CB3. In this manner, the field device 1 of the present embodiment can be connected to the distributed control system 100 of the related art without making any change to the distributed control system 100 of the related art.

The field device 1 of the present embodiment has a self-diagnosis function and can transmit diagnosis information indicating a diagnosis result of self-diagnosis through a wireless signal. For this reason, it is possible to collect diagnosis information by only constructing the information collecting system SY1 by providing the device management server SV that collects diagnosis information transmitted from the field device 1 using a wireless signal. That is, the information collecting system SY1 of the present embodiment can collect diagnosis information without making any change to the distributed control system 100 of the related art.

In the information collecting system SY1 of the present embodiment, diagnosis information transmitted from the field device 1 using a wireless signal is collected by the device management server SV. In this manner, in the information collecting system SY1 of the present embodiment, diagnosis information of the field device 1 is collected in the device management server SV without going through the controller 110 that handles information used for process control, and thus it is possible to completely separate the information used for process control and the diagnosis information of the field device 1 from each other. Thereby, two pieces of information having different properties (the information used for process control and the diagnosis information of the field device 1) can be individually managed by an operator and a worker of a plant. For example, the worker of the plant can change setting related to self-diagnosis without worrying about the convenience of the operator of the plant.

Second Embodiment

<Configuration of Field Device>

Figure 6:
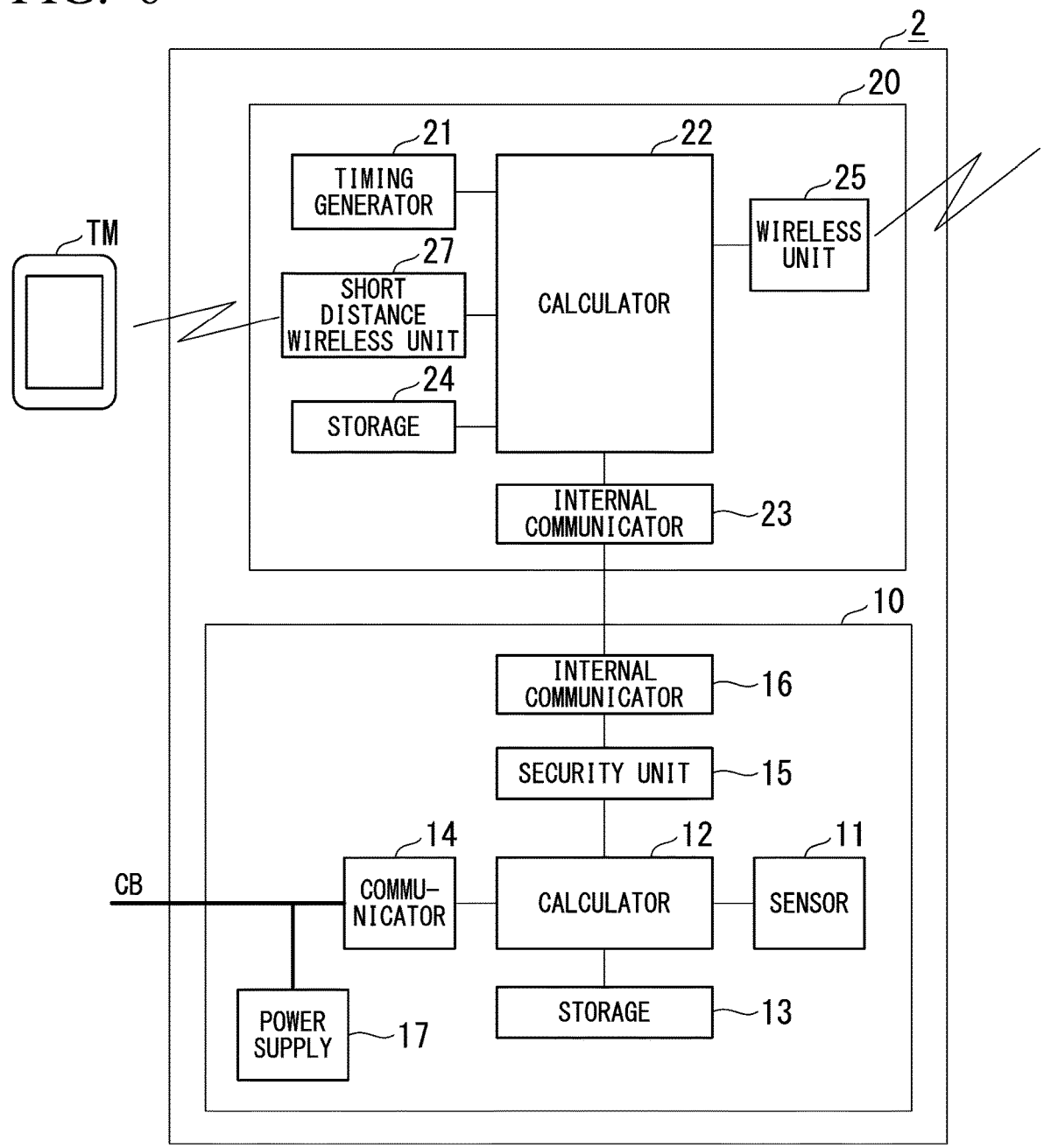
FIG. 6 is a block diagram showing main components of a field device according to a second embodiment of the present invention.

FIG. 6 is a block diagram showing main components of a field device according to a second embodiment of the present invention. In FIG. 6, components equivalent to the components shown in FIG. 1 are denoted by the same reference numerals and signs. As shown in FIG. 6, a field device 2 of the present embodiment is configured such that a short distance wireless unit 27 (second wireless unit) is added to the wireless module 20 of the field device 1 shown in FIG. 1. That is, the field device 2 of the present embodiment can perform short distance wireless communication with a terminal device TM (external device).

Short distance wireless communication performed between the field device 2 and the terminal device TM is near field communication (NFC). NFC means communication that can be performed in a case where a distance between apparatuses communicating with each other is, for example, equal to or less than several tens of cm (non-contact communication) and also includes communication which is performed in a state where housings of apparatuses communicating with each other are in contact with each other.

A short distance wireless unit 27 is operated using power supplied from the terminal device TM in a non-contact manner. The short distance wireless unit 27 exchanges various information with the terminal device TM by performing short distance wireless communication in a case where power is supplied from the terminal device TM in a non-contact manner. That is, the short distance wireless unit 27 performs a so-called passive operation. The short distance wireless unit 27, which is connected to a calculator 22 of a wireless module 20, outputs information transmitted from the terminal device TM to the calculator 22 and acquires the information transmitted to the terminal device TM from the calculator 22. For example, the short distance wireless unit 27 generates a communication frame including information acquired from the calculator 22 and transmits the generated communication frame as a wireless signal. The short distance wireless unit 27 generates a communication frame, but a communication frame may be generated by the calculator 22.

The terminal device TM is a device for performing, for example, maintenance of the field device 2 and various setting of the field device 2. The terminal device TM performs short distance wireless communication with the short distance wireless unit 27 to be capable of accessing (reading-out and writing) information stored in a storage 13 of a sensor module 10 and information stored in a storage 24 of the wireless module 20. The terminal device TM is a dedicated terminal for maintaining a general-purpose information device, such as a smart phone, a tablet, and a personal computer, or the field device 2.

In the wireless module 20 included in the field device 2 of the present embodiment, short distance wireless communication using the short distance wireless unit 27 is performed, in addition to wireless communication using a wireless unit 25. For this reason, in the field device 2 of the present embodiment, a request made to the sensor module 10 by the wireless module 20 may be given through the short distance wireless unit 27 of the wireless module 20 (the short distance wireless unit 27 serves as a request source), in addition to a case where a request is given through the wireless unit 25 of the wireless module 20 (the wireless unit 25 serves as a request source). For this reason, in the field device 2 of the present embodiment, a rule for permitting or rejecting a request made to the sensor module 10 by the wireless module 20 (a rule in the latter case) is added.

FIG. 7 is a diagram showing an example of a rule specified by a security unit of the field device in the second embodiment of the present invention. As shown in FIG. 7, a rule used by the security unit 15 is specified on the basis of the type of request made to the sensor module 10 by the wireless module 20, the type of information to be requested, and a request source. That is, the security unit 15 performs the above-described permission or rejection according to where a request source is in the wireless module 20 and what request is made for which information among pieces of information used by the sensor module 10.

In the example shown in FIG. 7, a "wireless unit (wireless unit 25)" and a "short distance wireless unit (short distance wireless unit 27)" are specified as request sources. In addition, with respect to each of the request sources, "read request (Read)" and "write request (Write)" are specified as the type of request made to the sensor module 10 by the wireless module 20, and "sensor value", "sensor settings", "diagnosis information", "diagnosis settings", and "wireless settings" are specified as the type of information to be requested.

In the example shown in FIG. 7, in a case where a request source is a "wireless unit", the same contents as in FIG. 2 are specified. That is, with respect to "read request", "permission (Accept)" is specified for all of "sensor value", "sensor settings", "diagnosis information", "diagnosis settings", and "wireless settings". With respect to "write request", "permission (Accept)" is specified for "diagnosis settings" and "wireless settings", but "rejection (Block)" is specified for "sensor value", "sensor settings", and "diagnosis information".

On the other hand, in a case where a request source is a "short distance wireless unit", "permission" is specified for all of "sensor value", "sensor settings", "diagnosis information", "diagnosis settings", and "wireless settings" with respect to "read request" and "write request". In a case where short distance wireless communication is performed by the short distance wireless unit 27, it is considered that an attack, illegal access, and the like to the sensor module 10 are not performed from a distant place (for example, through the Internet), and thus conditions for accessing the sensor module 10 are alleviated.

For this reason, for example, in a case where a "write request" for "sensor value", "sensor settings", and "diagnosis information" is made through the wireless unit 25 (the wireless unit 25 serves as a request source), the security unit 15 rejects the "write request". On the other hand, in a case where the above-described "write request" is made through the short distance wireless unit 27 (the short distance wireless unit 27 serves as a request source), the security unit 15 permits the "write request". The security unit 15 permits or rejects a request on the basis of, for example, information of a request source which is imparted by the calculator 22 for each request.

<Operation of Field Device>

Figure 8:
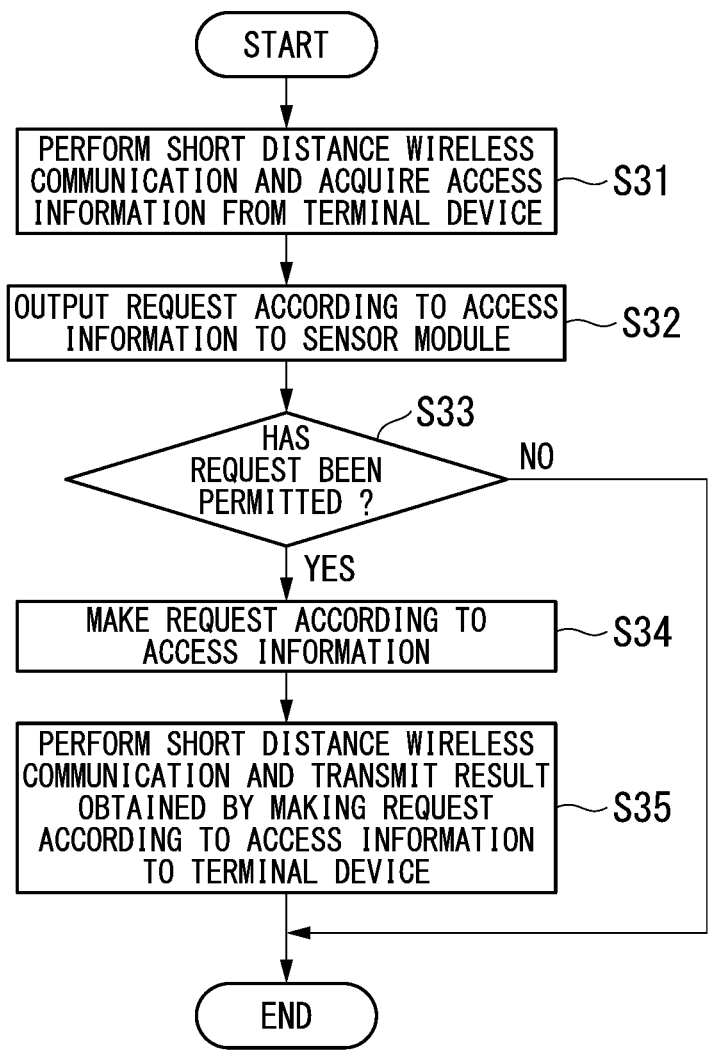
FIG. 8 is a flowchart showing an example of an operation of the field device according to the second embodiment of the present invention.

FIG. 8 is a flowchart showing an example of an operation of the field device according to the second embodiment of the present invention. The flowchart shown in FIG. 8 shows operations when short distance wireless communication is performed between the field device 2 and the terminal device TM. Processing in the flowchart shown in FIG. 8 is started when the terminal device TM is disposed in proximity to the short distance wireless unit 27 and the short distance wireless unit 27 is operated using power supplied from the terminal device TM in a non-contact manner.

When the processing is started, first, a process of performing short distance wireless communication and acquiring access information transmitted from the terminal device TM is performed by the short distance wireless unit 27 of the wireless module 20 (step S31). The above-described access information is information including the type of access (reading-out, writing, or the like) performed on the field device 2 by the terminal device TM and the type (a sensor value, diagnosis information, or the like) of information to be accessed. In order to facilitate understanding, it is assumed that the access information acquired by the short distance wireless unit 27 includes "read-out" as the above-described type of access and includes a "sensor value" as the above-described type of information to be accessed.

Next, in the wireless module 20, a process of outputting a request according to the above-described access information (here, a read request for a sensor value) to the sensor module 10 is performed by the calculator 22 (step S32). The request which is output from the calculator 22 is input to the security unit 15 through an internal communicator 23 of the wireless module 20 and an internal communicator 16 of the sensor module 10.

Then, in the security unit 15, it is determined whether or not a request according to access information (a read request for a sensor value) is permitted (step S33). Referring to FIG. 7, in a case where a request source is a "short distance wireless unit", "permission (Accept)" is specified for "read request (Read)" of "sensor value", and thus a determination result in step S33 is "YES". Thereby, the request according to the access information is input to a calculator 12 of the sensor module 10.

When the request according to the access information is input to the calculator 12, the request is performed by the calculator 12 (step S34). Specifically, in the sensor module 10, a process of reading out a sensor value stored in the storage 13 and outputting the sensor value to the wireless module 20 as a response is performed by the calculator 12. The sensor value which is output from the calculator 12 is input to the short distance wireless unit 27 through the security unit 15 and the internal communicator 16 of the sensor module 10 and the internal communicator 23 and the calculator 22 of the wireless module 20 in this order.

Then, in the wireless module 20, a process of performing short distance wireless communication and transmitting a result obtained by performing the request according to the access information to the terminal device TM is performed by the short distance wireless unit 27 (step S35). Specifically, a process of generating a communication frame including a sensor value and transmitting the generated communication frame to the terminal device TM through short distance wireless communication as a wireless signal is performed by the short distance wireless unit 27. A result obtained by performing the request according to the access information transmitted from the terminal device TM is acquired by the terminal device TM through the above-described processing.

As described above, in the field device 2 of the present embodiment, the short distance wireless unit 27 is provided in the wireless module 20, access information is acquired by performing short distance wireless communication with the terminal device TM, and a request according to the access information is performed. In addition, a result obtained by performing the request according to the access information by performing short distance wireless communication with the terminal device TM is transmitted. Thereby, it is possible to perform maintenance of the field device 2 and various setting of the field device 2 using the terminal device TM. Since the maintenance of the field device 2 and various setting can be performed using the terminal device TM in a non-contact manner, there is no problem even when the field device 2 is installed in a place (an explosion-proof area) where explosion proof is required.

Third Embodiment

Figure 9:
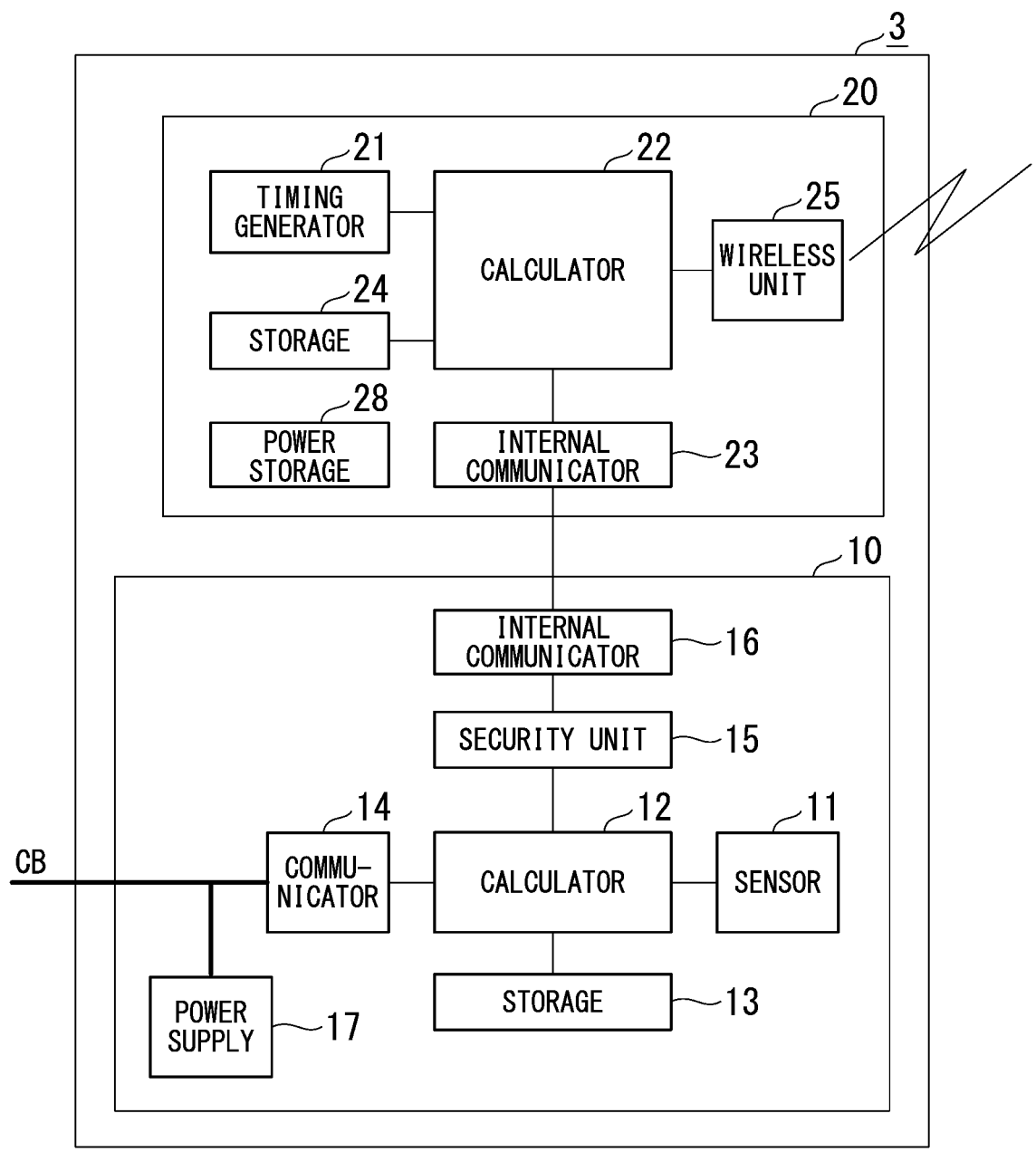
FIG. 9 is a block diagram showing main components of a field device according to a third embodiment of the present invention.

FIG. 9 is a block diagram showing main components of a field device according to a third embodiment of the present invention. In FIG. 9, components equivalent to the components shown in FIG. 1 are denoted by the same reference numerals and signs. As shown in FIG. 9, a field device 3 of the present embodiment is configured such that a power storage 28 is provided in the wireless module 20 of the field device 1 shown in FIG. 1.

When power supplied to a wireless module 20 from a sensor module 10 is not sufficient, it is considered that a communication distance of wireless communication using a wireless unit 25 is reduced or wireless communication using the wireless unit 25 cannot be performed. In the field device 3 of the present embodiment, in a case where a power storage 28 is provided in the wireless module 20 and wireless communication is performed using the wireless unit 25, power stored in the power storage 28 is supplied to the wireless unit 25 to prevent the shortage of power in the wireless unit 25.

The power storage 28 stores power (a portion of power) supplied to the wireless module 20 from a power supply 17 of the sensor module 10. For example, the power storage 28 stores a portion of power supplied through an internal communicator 16 of the sensor module 10 and an internal communicator 23 of the wireless module 20. The power supply 17 of the sensor module 10 and the power storage 28 may be connected to each other so as to store power which is directly supplied to the power storage 28 from the power supply 17. As the power storage 28, a large-capacity capacitor or a super capacitor (for example, an electric double layer capacitor, a lithium ion capacitor, or the like) can be used.

In the wireless module 20, a sleep state is maintained until power required to perform wireless communication in the wireless unit 25 is stored in the power storage 28. After power required to perform wireless communication in the wireless unit 25 is stored in the power storage 28, the above-described sleep state is canceled, and an operation of acquire necessary information (for example, diagnosis information) from the sensor module 10 and transmitting the acquired information from the wireless unit 25 as a wireless signal is performed. When wireless communication is performed by the wireless unit 25, power stored in the power storage 28 is supplied to the wireless unit 25.

Figure 10:
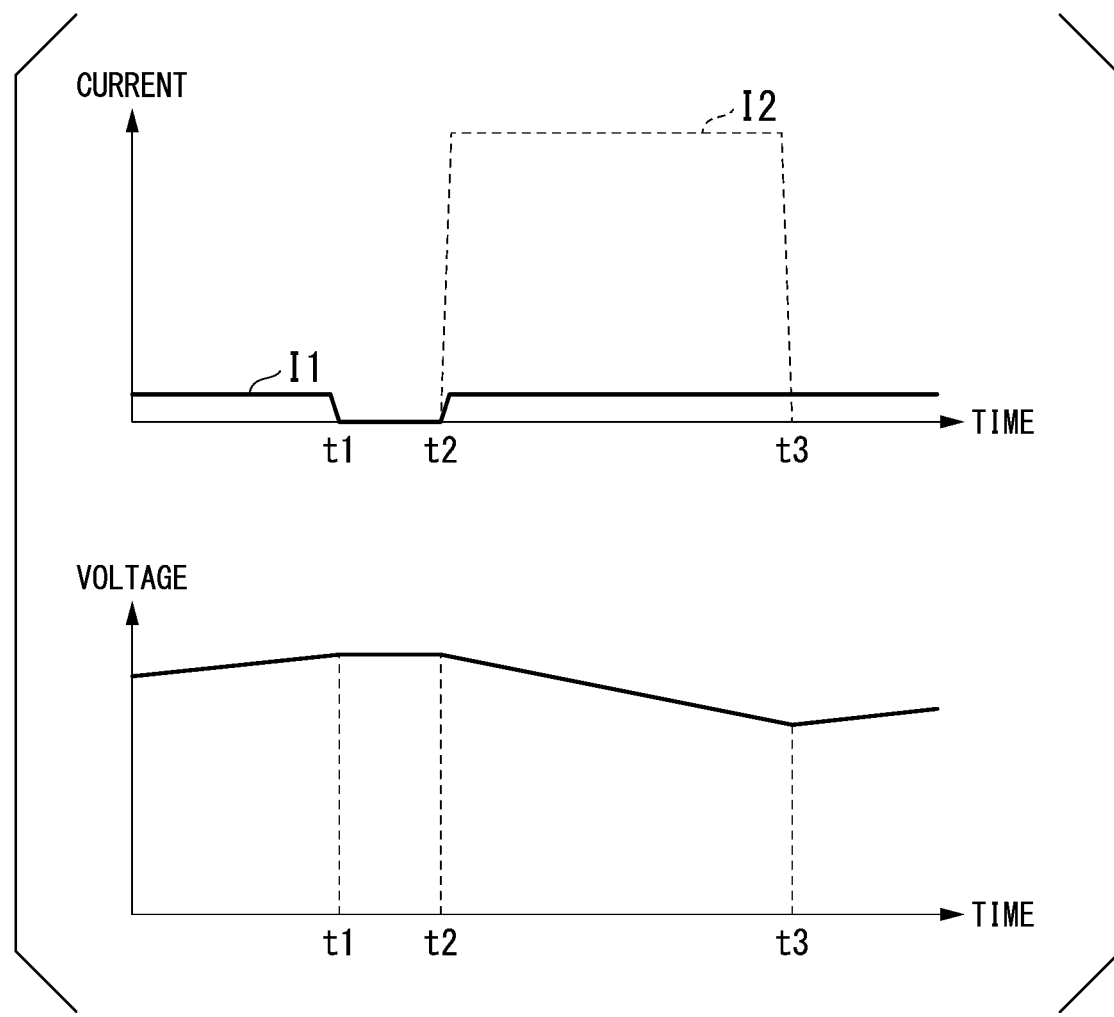
FIG. 10 is a diagram showing an operation of the field device according to the third embodiment of the present invention.

FIG. 10 is a diagram showing an operation of the field device according to the third embodiment of the present invention. In FIG. 10, a graph showing an example of changes in a current flowing to the power storage 28 over time and a graph showing an example of changes in a voltage appearing in the power storage 28 over time are shown. In the former graph, a current flowing into the power storage 28 (a charged current I1) and a current flowing out of the power storage 28 (a discharged current I2) are shown.

In the example shown in FIG. 10, a sleep state in the wireless module 20 is maintained until time t1. Accordingly, power supplied to the wireless module 20 from the sensor module 10 is stored in the power storage 28 until time t1 in FIG. 10. As shown in FIG. 10, the charged current I1 of the power storage 28 is constant while power is stored in the power storage 28, and a voltage appearing in the power storage 28 is gradually increased. When the voltage appearing in the power storage 28 reaches a predetermined voltage and the storage of power in the power storage 28 is terminated, the charged current I1 flowing to the power storage 28 is set to zero as shown in FIG. 10, and the voltage of the power storage 28 becomes constant.

In the example shown in FIG. 10, a timing signal is output from a timing generator 21 to a calculator 22 at time t2, so that a sleep state in the wireless module 20 is canceled, and wireless communication using the wireless unit 25 is performed between time t2 and time t3. Accordingly, power stored in the power storage 28 is supplied to the wireless unit 25 between time t2 and time t3 in FIG. 10. While power is supplied from the power storage 28 to the wireless unit 25, a constant discharged current I2 larger than the charged current I1 flows as shown in FIG. 10, and a voltage appearing in the power storage 28 is gradually decreased. When time t3 at which wireless communication using the wireless unit 25 is terminated elapses, the wireless module 20 is set to be in a sleep state again, and the storage of power in the power storage 28 is restarted.

Thus, in the present embodiment, in a case where the power storage 28 is provided in the wireless module 20 and wireless communication using the wireless unit 25 is performed, power stored in the power storage 28 is supplied to the wireless unit 25. Thereby, it is possible to prevent the shortage of power in the wireless unit 25 and to prevent a communication distance of wireless communication using the wireless unit 25 from being reduced or prevent wireless communication using the wireless unit 25 from being disabled.

Fourth Embodiment

Figure 11:
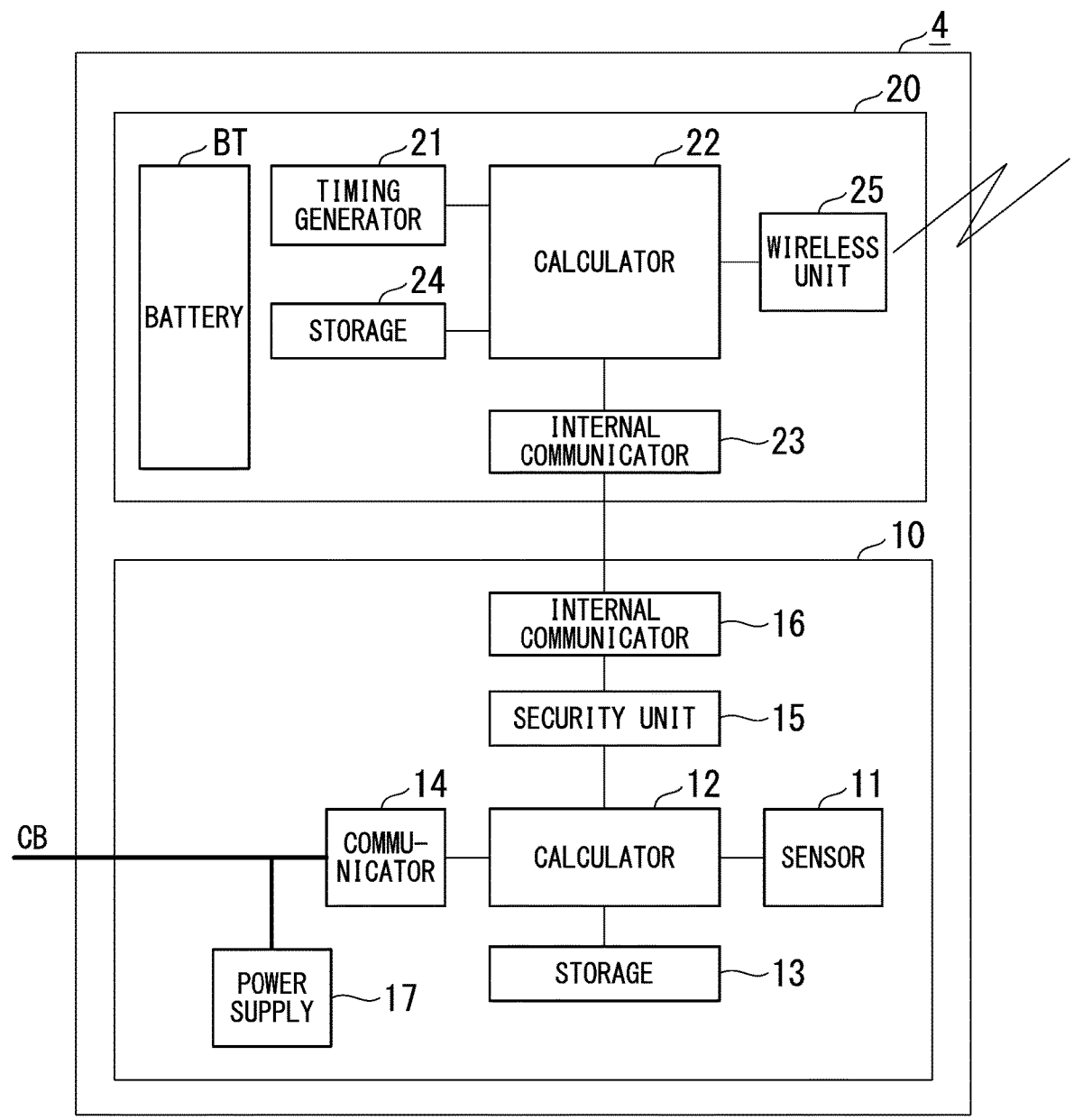
FIG. 11 is a block diagram showing main components of a field device according to a fourth embodiment of the present invention.

FIG. 11 is a block diagram showing main components of a field device according to a fourth embodiment of the present invention. In FIG. 11, components equivalent to the components shown in FIG. 1 are denoted by the same reference numerals and signs. As shown in FIG. 11, a field device 4 of the present embodiment is configured such that a battery BT is provided in the wireless module 20 of the field device 1 shown in FIG. 1.

When a wireless module 20 is retrofitted in a state where the sensor module 10 is operating, power to be supplied from the sensor module 10 to the wireless module 20 is rapidly increased, and thus a possibility that trouble will occur around a power supply is considered. The field device 4 of the present embodiment prevents trouble occurring around a power supply by providing the battery BT in the wireless module 20 and obtaining power required in the wireless module 20 from the battery BT.

The battery BT supplies power to each block of the wireless module 20. As the battery BT, for example, a primary battery, a secondary battery, a fuel cell, a condenser, and a capacitor (including a super capacitor) can be used. Alternatively, a battery that performs energy harvesting (so-called energy harvesting such as a solar battery) can be used as the battery BT.

In this manner, in the present embodiment, the battery BT is provided in the wireless module 20, and power required in the wireless module 20 is obtained from the battery BT. Thereby, it is possible to reduce (or eliminate) power supplied from the power supply 17 of the sensor module 10 to the wireless module 20. As a result, it is possible to reliably retrofit the wireless module 20 while maintaining an operating state of the sensor module 10.

Fifth Embodiment

Figure 12:
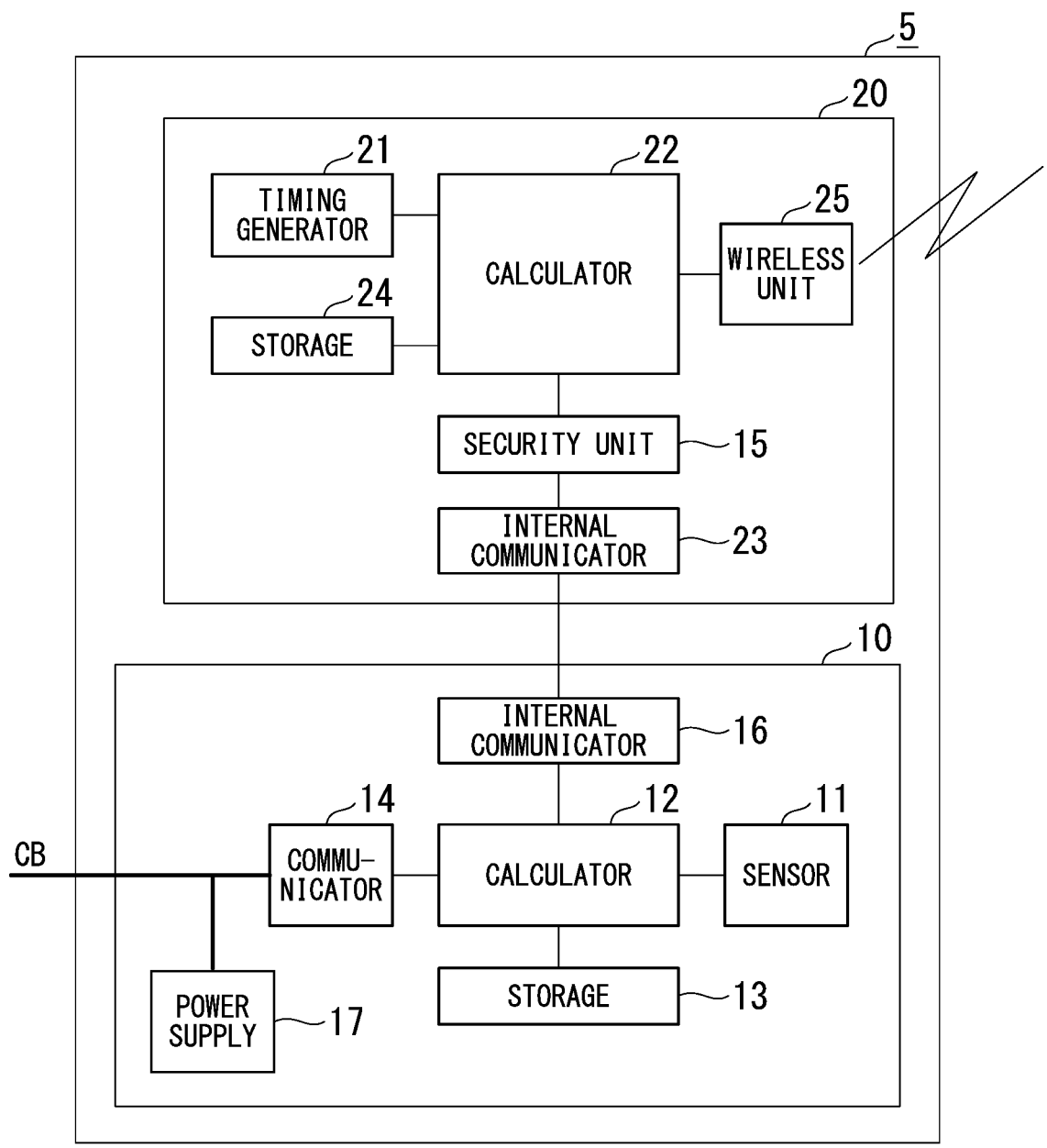
FIG. 12 is a block diagram showing main components of a field device according to a fifth embodiment of the present invention.

FIG. 12 is a block diagram showing main components of a field device according to a fifth embodiment of the present invention. In FIG. 12, components equivalent to the components shown in FIG. 1 are denoted by the same reference numerals and signs. As shown in FIG. 12, a field device 5 of the present embodiment is configured such that the security unit 15 provided in the sensor module 10 of the field device 1 shown in FIG. 1 is provided in a wireless module 20. The security unit 15 is provided between a calculator 22 and an internal communicator 23 in the wireless module 20.

In the present embodiment, permission or rejection of a request made to a sensor module 10 by the wireless module 20 is performed by the security unit 15 provided in the wireless module 20. Since a request rejected by the security unit 15 is not input to the sensor module 10, it is possible to prevent an attack or illegal access from being performed on the sensor module 10 that handles sensor values and diagnosis information which are used for process control, similar to the first embodiment.

In a case were the wireless module 20 is attachable to the sensor module 10, the security unit 15 can be retrofitted by attaching the wireless module 20 including the security unit 15 to a field device including only the sensor module 10 that does not include the security unit 15. Thereby, it is possible to prevent an attack or illegal access from being performed on the sensor module 10 even when the security unit 15 is not provided in the sensor module 10.

The security unit 15 is not necessarily provided in the sensor module 10 or the wireless module 20 and may be provided separately from the sensor module 10 and the wireless module 20. For example, the security unit 15 may be provided between the sensor module 10 and the wireless module 20, apart from the sensor module 10 and the wireless module 20.

Sixth Embodiment

Figure 13:
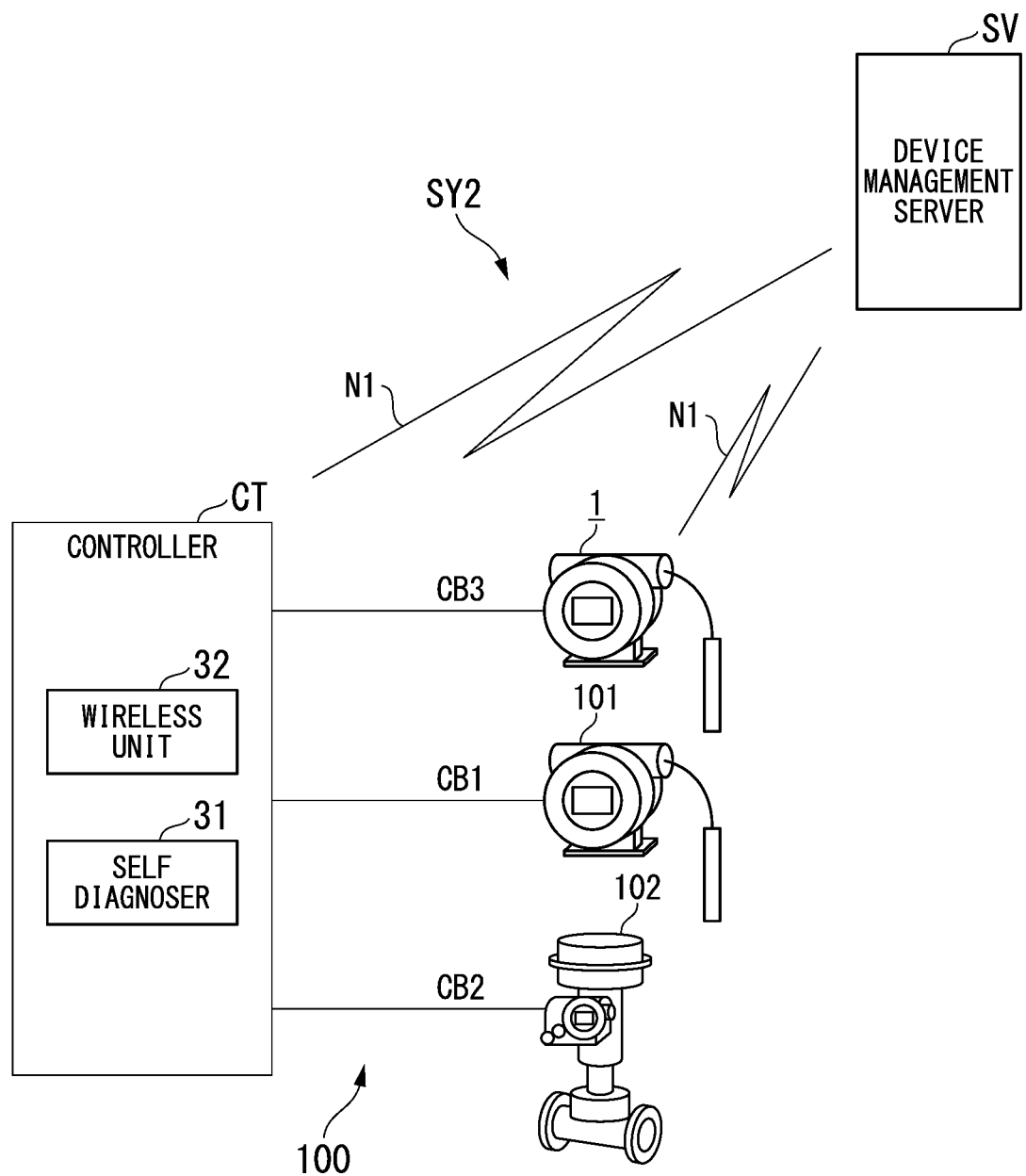
FIG. 13 is a diagram showing main components of an information collecting system according to a sixth embodiment of the present invention.

FIG. 13 is a diagram showing main components of an information collecting system according to a sixth embodiment of the present invention. In FIG. 13, components equivalent to the components shown in FIG. 5 are denoted by the same reference numerals and signs. An information collecting system SY2 shown in FIG. 13 includes a field device 1, a controller CT, and a device management server SV (collecting device), and the device management server SV collects diagnosis information (third information) transmitted from the controller CT in addition to diagnosis information (second information) transmitted from the field device 1. The diagnosis information of the field device 1 and the controller CT is transmitted through a communication channel N1 capable of low power consumption long distance wireless communication.

The controller CT is configured such that a self diagnoser 31 and a wireless unit 32 are added to the controller 110 of the related art shown in FIG. 5. Therefore, an analog distributed control system 100 of the related art which exchanges information used for process control using an analog signal is constructed by field devices 101 and 102 and the controller CT.

The self diagnoser 31 performs self-diagnosis of the controller CT to perform a process of generating diagnosis information (third information) indicating a diagnosis result. The wireless unit 32 transmits the diagnosis information generated by the self diagnoser 31 as a wireless signal. The wireless unit 32 performs wireless communication through, for example, a communication channel (LPWAN) capable of low power consumption long distance wireless communication, similar to the wireless unit 25 shown in FIG. 1.

In this manner, in the present embodiment, the controller CT configured such that the self diagnoser 31 and the wireless unit 32 are provided in the controller 110 of the related art shown in FIG. 5 is prepared, and diagnosis information of the controller CT is transmitted using a wireless signal. In addition, the device management server SV collects diagnosis information transmitted from the controller CT in addition to diagnosis information transmitted from the field device 1. Thereby, in the information collecting system SY2 of the present embodiment, diagnosis information of the controller CT can be completely separated from information used for process control, in addition to diagnosis information of the field device 1.

Although the field devices, the information collecting systems, and the information collecting method according to the embodiments of the present invention have been described, the present invention is not limited to the above-described embodiments, and modifications can be freely made without departing from the scope of the present invention. The above-described first to sixth embodiments can be appropriately combined with each other. For example, the field devices 2 to 5 according to the second to fifth embodiments can be applied to the information collecting system SY1 according to the first embodiment and the information collecting system SY2 according to the sixth embodiment.

For example, the configuration of the field device 2 according to the second embodiment may be applied to the field devices 3 to 5 according to the third to fifth embodiments, and the field devices 3 to 5 according to the third to fifth embodiments may be configured such that the short distance wireless unit 27 is provided in the wireless module 20. For example, the configuration of the field device 5 according to the fifth embodiment may be applied to the field devices 2 to 4 according to the second to fourth embodiments, and the field devices 2 to 4 according to the second to fourth embodiments may be configured such that the security unit 15 is provided in the wireless module 20.

For example, the configuration of the field device 4 according to the fourth embodiment may be applied to the field device 3 according to the third embodiment, and the field device 3 according to the third embodiment can be configured such that the battery BT is provided together with the power storage 28. In the case of such a configuration, wireless communication is performed using power of the power storage 28 when the charging of the power storage 28 has been completed, and thus it is possible to extend the life of the battery BT by suppressing the power consumption of the battery BT. On the other hand, wireless communication is performed using power of the battery BT when the charging of the power storage 28 has not been completed, and thus it is possible to perform wireless communication at all times by cancelling a sleep state of the wireless module 20.

In the above-described embodiments, description has been given on the assumption that the field devices 1 to 5 are sensor devices (for example, a flow meter, a temperature sensor, or the like). However, the field devices 1 to 5 may be valve devices such as flow control valves and on-off valves, actuator devices such as fans and motors, and other devices installed on a plant site.

In a case where the field devices 1 to 5 are actuators, for example, a valve and the like are provided. In addition, an operation of causing the communicator 14 to receive information indicating an operation amount transmitted through the transmission line CB, causing the calculator 12 to store information indicating an operation amount received by the communicator 14 in the storage 13, and causing the calculator 12 to operate a valve and the like using information obtained by performing predetermined processing on the information indicating the operation amount is performed.

Plants where the field devices 1 to 5 are installed include a plant that manages and controls a well source such as a gas field or an oil field and the surroundings thereof, a plant that manages and controls power generation of such as water power, thermal power, and nuclear power, a plant that manages and controls energy harvesting such as sunlight and wind power, and a plant that manages and controls water and sewage, dams, and the like, in addition to an industrial plant of such as chemistry. Furthermore, it should be noted that the above-described plants are merely examples and the present invention is not limited to the above-described plants.

What is claimed is:

1. A field device comprising:
   a first processor configured to perform a process of communicating first information used for process control and a process of generating second information comprising a diagnosis result obtained by performing self-diagnosis of the field device;
   a second processor comprising a first wireless unit configured to perform wireless communication, the second processor being configured to request the first processor to read at least the second information and to perform a process of transmitting, from the first wireless unit, the second information obtained through the read request as a wireless signal; and
   a security unit configured to permit or reject a request made to the first processor by the second processor in accordance with a rule which is specified in advance.

2. The field device according to claim 1, wherein the rule is specified on the basis of a type of request made to the first processor by the second processor and a type of information to be requested.

3. The field device according to claim 1, wherein the security unit is configured to reject a write request for the first information or the second information in a case where the write request is made through the first wireless unit.

4. The field device according to claim 1, wherein
   identification information which is uniquely determined is allocated to the second processor, and
   the second processor is configured to transmit, from the first wireless unit, the identification information attached to the second information obtained through the read request as a wireless signal.

5. The field device according to claim 1, wherein the security unit is provided in the first processor.

6. The field device according to claim 1, wherein the security unit is provided in the second processor.

7. The field device according to claim 1, wherein the second processor further comprises a second wireless unit configured to perform short distance wireless communication with an external device.

8. The field device according to claim 7, wherein the security unit is configured to permit a write request for the first information or the second information in a case where the write request is made through the second wireless unit.

9. The field device according to claim 1, wherein the first wireless unit is configured to perform low power consumption long distance wireless communication.

10. The field device according to claim 1, wherein the first processor comprises a power supply configured to generate power required for an operation of at least the first processor from a current flowing through a transmission line used for communication of the first information.

11. The field device according to claim 10, wherein the second processor further comprises a power storage configured to store power supplied from the power supply and to obtain power required for an operation of at least the first wireless unit.

12. The field device according to claim 10, wherein the second processor further comprises a battery configured to supply power required for an operation of the second processor.

13. The field device according to claim 1, wherein the first processor is configured to perform processing according to a request permitted by the security unit among requests output from the second processor.

14. The field device according to claim 2, wherein permission or rejection is specified for each combination of the type of request and the type of information to be requested in the rule.

15. The field device according to claim 1, wherein the rule is specified on the basis of a type of request made to the first processor by the second processor, a type of information to be requested, and a request source.

16. The field device according to claim 15, wherein permission or rejection is specified for each combination of the type of request, the type of information to be requested, and the request source in the rule.

17. The field device according to claim 7, wherein the security unit is configured to alleviate a condition to permit a request for the first information or the second information in a case where the request is made through the second wireless unit as compared to a case where the request is made through the first wireless unit.

18. An information collecting system comprising:
the field device according to claim 1; and
a collecting device configured to collect the second information transmitted from the field device.

19. The information collecting system according to claim 18, further comprising:
a controller configured to control the field device and to perform self-diagnosis of the controller to perform a process of generating third information indicating a diagnosis result,
wherein the collecting device is configured to collect the third information transmitted from the controller in addition to the second information transmitted from the field device.

20. An information collecting method comprising:
transmitting the second information from the field device according to claim 1; and
collecting the second information transmitted from the field device.

* * * * *